United States Patent
Zavalkovsky

(10) Patent No.: US 7,313,635 B1
(45) Date of Patent: Dec. 25, 2007

(54) METHOD AND APPARATUS FOR SIMULATING A LOAD ON AN APPLICATION SERVER IN A NETWORK

(75) Inventor: Arthur Zavalkovsky, Netanya (IL)

(73) Assignee: Cisco Technology, San Jose, CA (US)

( * ) Notice: Subject to any disclaimer, the term of this patent is extended or adjusted under 35 U.S.C. 154(b) by 964 days.

(21) Appl. No.: 10/104,902

(22) Filed: Mar. 21, 2002

(51) Int. Cl.
   *G06F 15/16* (2006.01)
(52) U.S. Cl. ............ 709/248; 375/134; 709/251; 370/352
(58) Field of Classification Search ............ 709/201, 709/230, 232, 235, 224, 207, 250, 218, 226, 709/241, 200, 251, 248; 370/452, 422, 348, 370/241, 352, 389, 400, 428, 316, 248; 714/43, 714/57, 738; 713/201; 379/40, 115, 406; 702/108; 455/517, 423; 340/2.4; 375/134; 703/14, 21, 13; 715/735
   See application file for complete search history.

(56) References Cited

U.S. PATENT DOCUMENTS

| | | | | |
|---|---|---|---|---|
| 4,390,968 A | * | 6/1983 | Hennessy et al. | 705/72 |
| 4,574,378 A | * | 3/1986 | Kobayashi | 370/348 |
| 5,025,457 A | * | 6/1991 | Ahmed | 375/354 |
| 5,142,550 A | * | 8/1992 | Tymes | 375/141 |
| 5,177,488 A | * | 1/1993 | Wang et al. | 342/167 |
| 5,228,031 A | * | 7/1993 | Mertelmeier et al. | 370/422 |
| 5,247,517 A | * | 9/1993 | Ross et al. | 370/452 |
| 5,271,000 A | * | 12/1993 | Engbersen et al. | 370/244 |
| 5,440,719 A | * | 8/1995 | Hanes et al. | 703/21 |
| 5,504,774 A | * | 4/1996 | Takai et al. | 375/134 |
| 5,649,164 A | * | 7/1997 | Childs et al. | 703/16 |
| 5,668,803 A | * | 9/1997 | Tymes et al. | 370/312 |
| 5,727,149 A | * | 3/1998 | Hirata et al. | 709/250 |
| 5,806,037 A | * | 9/1998 | Sogo | 704/268 |
| 5,936,940 A | * | 8/1999 | Marin et al. | 370/232 |
| 5,943,394 A | * | 8/1999 | Ader et al. | 379/40 |
| 6,098,108 A | * | 8/2000 | Sridhar et al. | 709/239 |

(Continued)

OTHER PUBLICATIONS

On Improving Ethernet LAN Security—Rinat Khoussainov Mikhail □□www.smi.ucd.ie/~rinat/papers/etho_nagib.pdf.*

(Continued)

*Primary Examiner*—Thong Vu
(74) *Attorney, Agent, or Firm*—Hickman Palermo Truong & Becker LLP

(57) ABSTRACT

A method is disclosed for simulating a load on an application server in a network. The method intercepts data packets of a request from a sender to a receiver. The data packets to be intercepted can be selected according to specified criteria, such as communications protocol or port and address information of the sender and/or receiver. A simulation session can begin and end based on a specified period of time or after a specified number of data packets have been received. The intercepted data packets are stored in a buffer and the time of arrival of the data packets is recorded. The data packets are held in the buffer for a user specified delay time. Upon expiration of the delay time, the data packets are forwarded to the receiver. Alternately, the method can operate bi-directionally, or by intercepting and delaying data packets of a response of the receiver sent to the sender.

43 Claims, 9 Drawing Sheets

U.S. PATENT DOCUMENTS

| | | | | |
|---|---|---|---|---|
| 6,269,330 B1* | 7/2001 | Cidon et al. | ............ | 714/43 |
| 6,317,775 B1* | 11/2001 | Coile et al. | ............ | 709/201 |
| 6,343,362 B1* | 1/2002 | Ptacek et al. | ............ | 713/201 |
| 6,389,462 B1* | 5/2002 | Cohen et al. | ............ | 709/218 |
| 6,442,141 B1* | 8/2002 | Borella et al. | ............ | 370/248 |
| 6,449,647 B1* | 9/2002 | Colby et al. | ............ | 709/226 |
| 6,456,624 B1* | 9/2002 | Eccles et al. | ............ | 370/400 |
| 6,477,150 B1* | 11/2002 | Maggenti et al. | ............ | 370/312 |
| 6,493,448 B1* | 12/2002 | Mann et al. | ............ | 379/406.01 |
| 6,606,316 B1* | 8/2003 | Albert et al. | ............ | 370/389 |
| 6,618,761 B2* | 9/2003 | Munger et al. | ............ | 709/241 |
| 6,687,227 B1* | 2/2004 | Li et al. | ............ | 370/231 |
| 6,724,730 B1* | 4/2004 | Mlinarsky et al. | ............ | 370/241 |
| 6,742,044 B1* | 5/2004 | Aviani et al. | ............ | 709/235 |
| 6,791,549 B2* | 9/2004 | Hubrecht et al. | ............ | 345/473 |
| 6,842,511 B1* | 1/2005 | Paiz | ............ | 379/115.01 |
| 6,856,950 B1* | 2/2005 | Abts et al. | ............ | 703/13 |
| 6,862,618 B1* | 3/2005 | Gray et al. | ............ | 709/224 |
| 6,877,043 B2* | 4/2005 | Mallory et al. | ............ | 709/251 |
| 6,898,564 B1* | 5/2005 | Odhner et al. | ............ | 703/21 |
| 6,901,357 B1* | 5/2005 | Patiejunas | ............ | 703/14 |
| 6,965,769 B2* | 11/2005 | Bims et al. | ............ | 455/423 |
| 6,973,622 B1* | 12/2005 | Rappaport et al. | ............ | 715/735 |
| 7,000,031 B2* | 2/2006 | Fischer et al. | ............ | 709/248 |
| 7,069,316 B1* | 6/2006 | Gryaznov | ............ | 709/224 |
| 7,075,893 B1* | 7/2006 | Mlinarsky et al. | ............ | 370/241 |
| 2002/0055999 A1* | 5/2002 | Takeda | ............ | 709/224 |
| 2002/0071424 A1* | 6/2002 | Chiu et al. | ............ | 370/352 |
| 2002/0080771 A1* | 6/2002 | Krumel | ............ | 370/352 |
| 2003/0112772 A1* | 6/2003 | Chatterjee et al. | ............ | 370/316 |
| 2004/0218608 A1* | 11/2004 | Patiejunas | ............ | 370/395.21 |

OTHER PUBLICATIONS

Logical Framework for Group Communications with Mobile Hosts—Noël, Grad, Pansiot ☐☐dpt-info.u-strasbg.fr/·noel/biblio/africom.ps.gz.*

Eager Writeback—a Technique for Improving Bandwidth..—Lee, Tyson, Farrens (2000) ☐☐www.eecs.umich.edu/~tyson/Postscript/Micro00_2.ps.gz.*

A Study on Web Caching Architectures and Performance-Athena Vakali Department (2001) www.csd.auth.gr/~oswinds/papers/sci01.pdf.*

Performance-Analysis Of (1996) indy.iet.unipi.it/papers/1996/./flow_control.ps.gz.*

COPAS: Dynamic Contention-Balancing to Enhance the..—Cordeiro, Das, Agrawal (2002) www.cs.sunysb.edu/~samir/Pubs/copas-ic3n.pdf.*

J. Postel, "Transmission Control Protocol," IETF RFC 793, Sep. 1981.

W. Stevens, "TCP Slow Start, Congestion Avoidance, Fast Retransmit, and Fast Recovery Algorithms," IETF RFC 2001, Jan. 1997.

Cisco Systems, Inc., "Cisco Internetworking Technologies Handbook Third Edition" (Indianapolis, IN: Cisco Press, 2000), chap. 31, pp. 475-494.

* cited by examiner

METHOD AND APPARATUS FOR SIMULATING A LOAD ON AN APPLICATION SERVER IN A NETWORK

FIELD OF THE INVENTION

The present invention generally relates to data communications networks. The invention relates more specifically to a method and apparatus for simulating a load on an application server in a network.

BACKGROUND OF THE INVENTION

It is common for software or hardware in multi-tier systems to communicate with a back-end server during time critical transactions with an end user. For example, a network access server such as CiscoSecure Access Control Server (ACS) is able to perform user authentication and authorization against a number of third party back-end servers such as directory servers, relational database management system (RDBMS) servers, etc. In order to provide greater uptime and reliability, information technology (IT) and quality assurance teams associated with the manufacturer of these systems often attempt to verify that the hardware and software in these systems communicate effectively with the back-end servers.

However, verifying the reliability of communications systems can be difficult when the problem in communications between a client and a server is related to or caused by an overload and non-responsiveness of the back-end server, rather than network traffic. Most systems cannot provide a mechanism to test a product or reproduce a customer problem where the back-end server is overloaded, and consequently delays sending responses to the client. This may occur where a client's request successfully reaches the server host over the network, but the client request must wait in the server's queue until the server is available to handle the request. In this situation, the problem is not in the loading of the network, but rather in the loading of the server.

Network load simulators are commonly used for simulating an artificial load on a network. The network load simulator floods the network with artificial traffic that competes with the application traffic for network resources. It creates a bottleneck in the network for communications between the application client and application server. Thus, a network load simulator is well adapted and useful for testing the reliability of the server and evaluating the response of a network when the application server is unreachable as a network host.

However, the use of network load simulators has numerous disadvantages, particularly when testing the susceptibility of the client to delays in the response of the server. First, they are incapable of simulating a scenario where client request packets have successfully reached the server, but due to overloading or some other problem, the server is unable to provide a response. In that case, the network connection is established and maintained, so flooding the network with artificial traffic will not simulate this problem.

Second, if non-responsiveness of the server is caused by bugs in the client application or server application, flooding the network with artificial traffic will not reveal the source of the application bugs. For example, if the client makes a synchronous RPC call to the server but the server is unreachable, an error eventually is returned to the client. On the other hand, if the call successfully reaches the server but the server is overloaded, the server does not respond and the client receives no indication of an error. Flooding the network will not simulate this problem.

Third, it is difficult to reproduce a problem arising from server application loading with network load simulators, because they are difficult to fine-tune in order to simulate and reproduce the server delay.

Also, although some network load simulators can produce or replay application specific traffic and can be used to simulate the server load, there is undue special configuration and preparation work required to do it, and reproducing the exact server delay remains difficult.

Based on the foregoing, there is a clear need for a generic application server load simulator that allows the load of application servers to be simulated on the network without the need to create application specific clients. There is a specific need for a simulator that can simulate a scenario where client request packets reach the server, but the response is delayed as a result of load on the server rather than a bottleneck in the network.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for simulating a load on an application server in a network.

The method begins by intercepting data packets of a request from a sender to a receiver. The data packets to be intercepted can be selected according to predetermined criteria, such as communications protocol or port and address information of the sender and/or receiver. A simulation session can begin and end based on a specified period of time or after a specified number of data packets have been received. The intercepted data packets are stored in a buffer and the time of arrival of the data packets is recorded. The data packets will be held in the buffer for a user specified delay time. Upon expiration of the delay time, the data packets are forwarded to the receiver. The receiver then responds to the delayed request, thereby providing an accurate simulation of a server overloading problem. Alternately, the method can operate bi-directionally, intercepting and delaying data packets of the response of the receiver to the sender.

When the data packets are TCP packets, the method sends a TCP acknowledgement message to the sender of the request after each data packet is intercepted, in order to keep the TCP connection open. When the data packets are eventually forwarded to the receiver, the TCP acknowledgement message from the receiver will be intercepted to avoid sending duplicate TCP acknowledgment messages to the sender.

In other aspects, the invention encompasses a computer apparatus and a computer readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for simulating a load on an application server in a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1A:
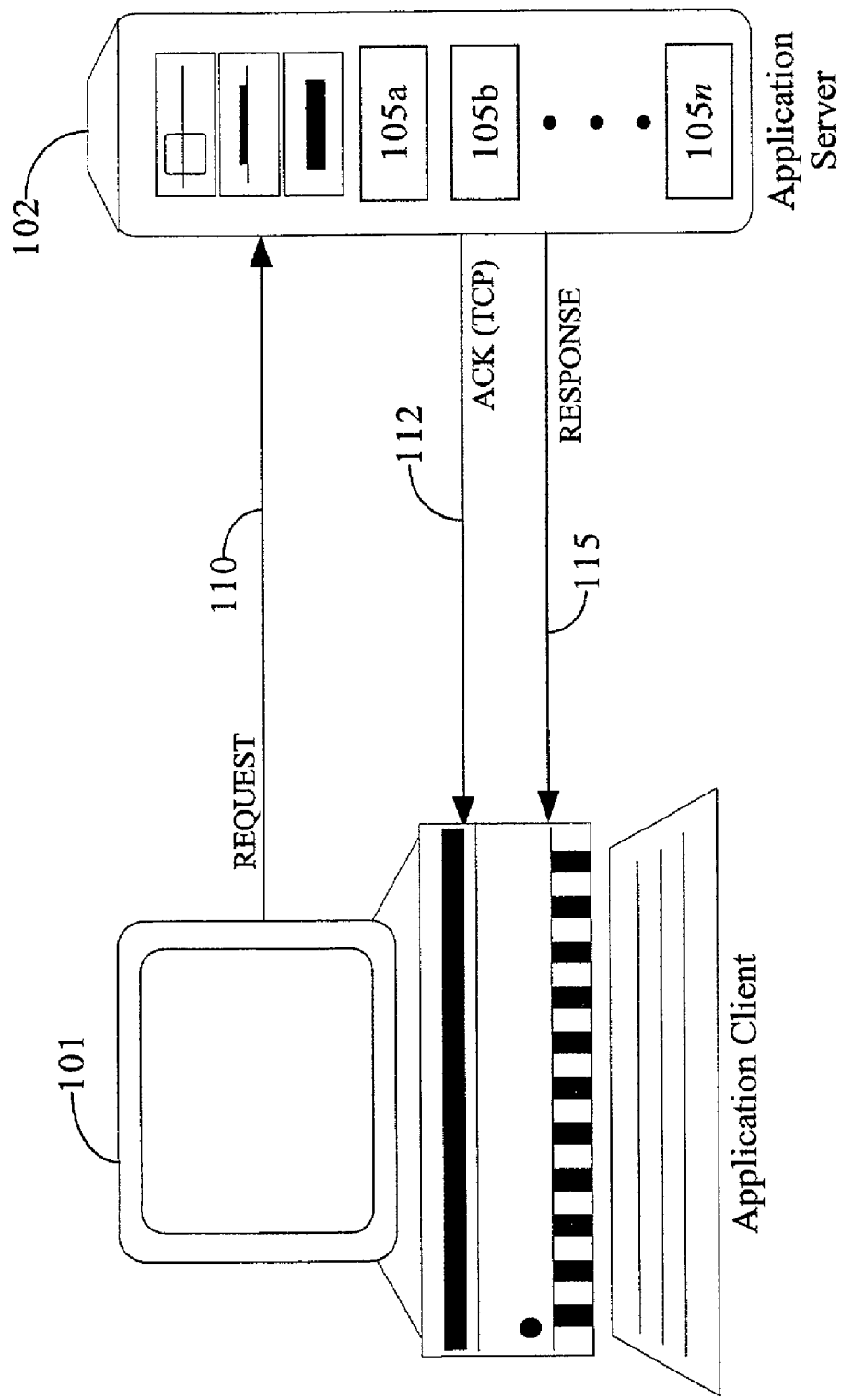
FIG. 1A is a block diagram that illustrates an application client communicatively coupled to an application server.

Embodiments are described herein according to the following outline:
 1.0 OPERATIONAL CONTEXT
 2.0 STRUCTURAL OVERVIEW
 3.0 OPERATIONAL OVERVIEW
 4.0 IMPLEMENTATION MECHANISMS—HARDWARE OVERVIEW
 5.0 EXTENSIONS AND ALTERNATIVES 1.0 Operational Context FIG. 1A illustrates a block diagram of an application client 101 that is communicatively coupled to an application server 102. Application server 102 comprises one or more applications 105 that are loaded and stored on application server 102. Application server 102 may execute any of applications 105 at the request of application client 101.

To obtain service, application client 101 sends a request to application server 102 requesting service from one or more of applications 105. The request comprises a byte stream made up of multiple data packets 110 that conform to a communications transport protocol. In one embodiment, the communications transport protocol is Transmission Control Protocol (TCP). In another embodiment, the communications transport protocol is User Datagram Protocol (UDP). These and other communications transport protocols are contemplated by and within the scope of the invention.

In a TCP environment, application server 102 will return an acknowledgement message 112 in response to the successful transmission of each data packet 110 of the request to application client 101. If acknowledgment message 112 is not received at application client 101 within a specified period of time after transmission of associated data packet 110, application client 101 assumes that associated data packet 110 was not successfully received at application server 102 and will resend that data packet 110. However, if acknowledgement message 112 is received at application client 101 within the specified period of time, successful receipt of data packet 110 is confirmed.

After successful transmission of all data packets 110 of the request, application server 102 processes request and returns a response 115 to application client 101. Response 115 may include data in response to a query, execution of program instructions from application 105, etc.

In certain circumstances, however, application server 102 will fail to return response 115 even after returning acknowledgement message 112 to application client 101 in response to successful receipt of data packets 110 of the request. In some cases, this failure is caused by data congestion on the network itself, which inhibits response 115 from reaching application client 101. In other cases, the failure may have nothing to do with network congestion, but rather is caused by defects or inefficiencies in the software code of application 105, hardware problems in applications server 105, defects in the interaction between applications server 102 and application client 101, or any number of technical problems that may exist at applications server 102. If application client 101 fails to receive response 115 within a prescribed time limit, it will time-out and return an error message to a user or to another application or system. The user at application client 101 is thus prevented from accessing data or applications at applications server 102. Implementing software bug fixes and/or hardware repairs and upgrades on applications client 101 or applications 105 may often rectify these problems. However, it is difficult to test and verify the effectiveness of the chosen remedies using a network load simulator that merely floods the network with artificial traffic. It is more desirable to test the remedies by simulating a load on application server 102 and evaluating the remedies accordingly.

2.0 Structural Overview

Figure 1B:
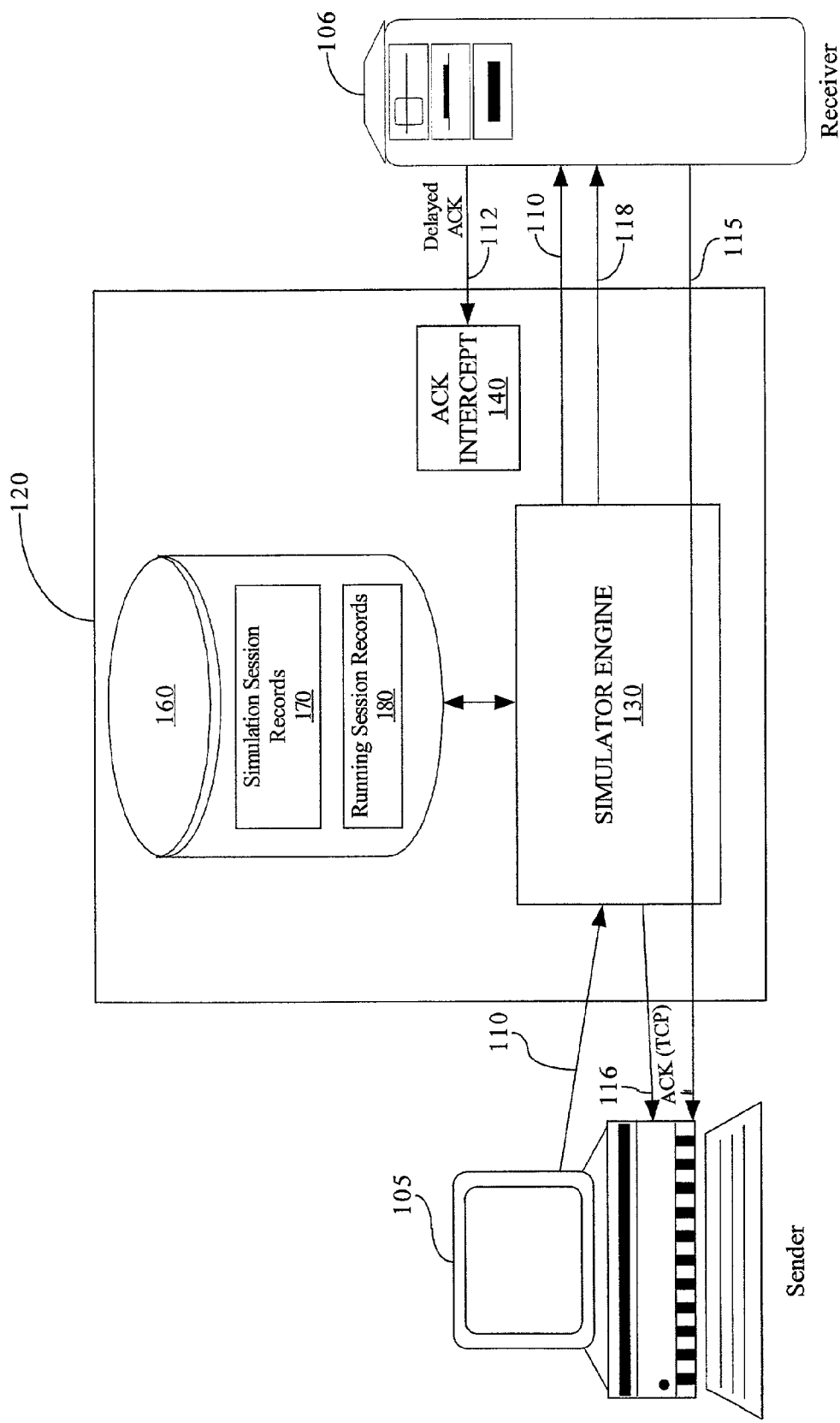
FIG. 1B illustrates a block diagram of an application server load simulator.

FIG. 1B illustrates a block diagram of an application server load simulator 120 in one embodiment of the invention. As shown, simulator 120 is operative in a communications path between a sender 105 and a receiver 106 and is communicatively coupled to each. Sender 105 and receiver 106 may comprise any kind of processing device. Further, each of the sender 105 and receiver 106 may alternatively serve as either client or server, and the techniques described herein provide symmetrical behavior corresponding to the direction of traffic, as described further below.

Simulator 120 includes a simulator engine 130, an ACK intercept module 140 and storage 160. Storage 160 comprises one or more simulation session records 170 and one or more one running session records 180. Simulation session record 170 is described in more detail below with respect to FIG. 2. Running session record 180 is described in more detail below with respect to FIG. 3. The function and operation of simulator engine 130 and ACK intercept module 140 are described in more detail below with respect to FIG. 4. The ACK intercept module 140 intercepts acknowledgment messages in both directions of traffic between sender and receiver.

Referring again to FIG. 1B, the general operation of simulator 120 in one embodiment of the invention is shown. Sender 105 sends a request, made up of a stream of data packets 110, to receiver 106. Data packets 110 are intercepted by simulator 120 and processed by simulator engine 130. In order to simulate an artificial time delay of the transmission of response 115 from receiver 106 to sender 105, simulator engine 130 can delay transmission of data packets 110 for a specified period of time. Eventually, simulator engine 130 will transmit data packets 110 as delayed data packets 118 to receiver 106 after the simulated time delay has elapsed. Delayed data packets 118 comprise the same packet stream intercepted by simulator engine 130 from the request. Receiver 106 will then transmit response 115 to sender 105. Typically, response 115 is sent promptly by receiver 106 because the receiver is operating normally, but the delay in sending packets 110 creates the impression that receiver 106 is heavily loaded and that response 115 was delayed. Simulator 120 thereby simulates an artificial load on receiver 106 from the viewpoint of sender 105.

In another embodiment of the invention, simulator 120 operates to introduce delay in the opposite transmission direction. That is, simulator 120 can hold and delay the transmission of data packets of response 115 sent from receiver 106 to sender 105. In still another embodiment, simulator 120 operates to introduce delay bi-directionally.

In yet another embodiment, where communications between sender 105 and receiver 106 use the TCP transport protocol, simulator engine 130 will return a simulator acknowledgement message 116 to sender 105 upon receipt of each data packet 110 of the request. Simulator acknowledgment message 116 may be structured as a TCP ACK message. When sender 105 receives acknowledgement message 116, sender 105 assumes that the associated data packet 110 of the request has been successfully received at receiver 106. This approach also ensures that a TCP connection between sender 105 and simulator 120 remains open, because failure to receive the TCP ACK message in an acceptable period of time would normally cause sender 105 to drop the TCP connection and report an error.

Sender 105 then waits for response 115 to arrive from receiver 106. As described above, simulator engine 130 delays transmission of data packets 110 of the request for a specified simulation period. Upon expiration of the simulation period, data packets 110 are released to receiver 106 in the form of delayed data packets 118. Upon acceptance of delayed data packets 118, receiver 106 returns a delayed acknowledgement message 112 to simulator 120. However, because simulator engine 130 has already returned simulator acknowledgment message 116 to sender 105 for each data packet 110 delayed by simulator engine 130, simulator 120 intercepts delayed acknowledgement message 112 at ACK intercept 140 to prevent duplicate transmission of an acknowledgement message to sender 105.

Using simulator 120 in this way allows quality assurance personnel and others to program and simulate an intentional time delay between the receipt of the request by receiver 106 and the transmission of response 115. By artificially simulating loading and non-responsiveness of receiver 106 in this way, the response of sender 105 to the simulated loading can be evaluated for effectiveness in the troubleshooting and debugging efforts of client applications.

Upon receiving the data packet 115, the simulator engine 130 returns an acknowledge message to the receiver. This creates the illusion, to the receiver, that the sender received the packet.

Figure 2:
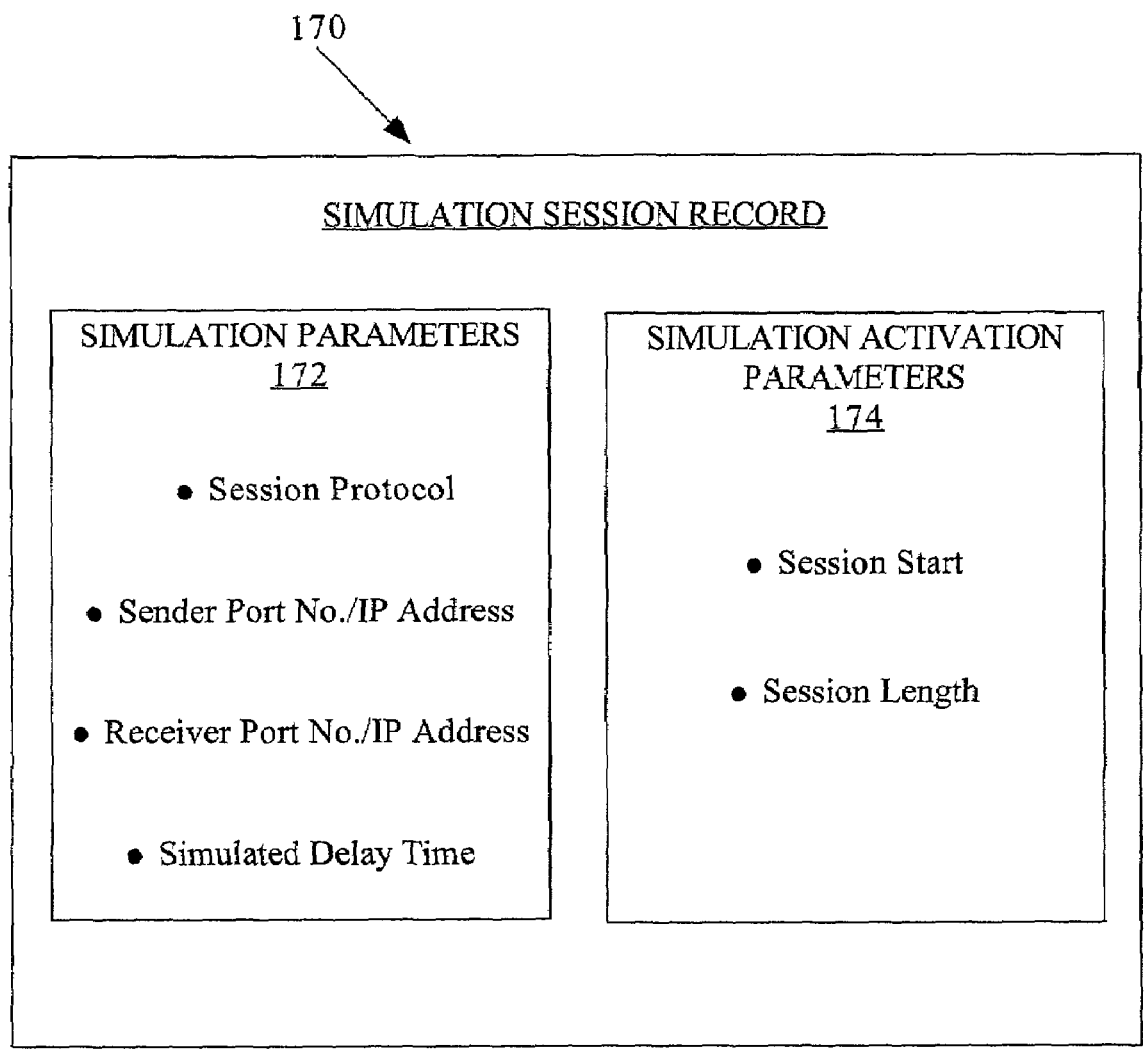
FIG. 2 illustrates a detailed depiction of a simulation session record of the application server load simulator of FIG. 1B.

FIG. 2 illustrates a detailed depiction of simulation session record 170 of simulator 120 (FIG. 1B). Simulation session record 170 allows simulator engine 130 to execute numerous simulation sessions that are pre-configured and programmed by a user. Simulation session record 170 comprises a simulation parameters section 172 and a simulation activation parameters section 174.

Simulation parameters section 172 contains values of one or more parameters that may be used to configure a simulation session. In one example embodiment, such parameters may include parameters identifying specific connections where a load simulation is desired and specifying a desired simulated time delay. Simulation parameters section 172 comprises session protocol parameters, IP address and port of sender 105, IP address and port of receiver 106 and simulated delay time.

The session protocol parameters of simulation parameters section 172 specify the particular transport protocol that is to be subject to a specific configured simulation session. Examples of protocol parameters include, but are not limited to, TCP and UDP transport protocols. Specific port numbers and IP address of the sender, the receiver or both may be defined for a configured simulation session in simulation parameters section 172. Simulator engine 130 commences a simulation session based on this information whenever a communication path between the specified port and address of sender 105 and receiver 106 is requested. The simulated delay time parameter specifies the time delay that is to be imposed by simulator engine 130 before data packets 110 of the request are forwarded on to receiver 106.

Simulation activation parameters section 174 comprises a session start parameter and a session length parameter. Once a configured simulation session defined by simulation parameters 172 is identified by simulator engine 130, the session will begin pursuant to the session start parameter and end after the session length parameter has expired. The session start parameter can be defined by various criteria. For example, the session start parameter can specify a time delay (e.g. begin after t milliseconds), a packet arrival delay (e.g. begin after n packets have arrived), a request arrival delay (e.g. after m requests have been received) or no delay at all. In one embodiment, where data packets 110 are TCP packets, the session start parameter can specify that the simulation session should not start until after the three-way TCP handshake between sender 105 and receiver 106 is completed. This assures that the simulation session will not interfere with the establishment of the TCP connection between sender 105 and receiver 106.

Likewise, the session length parameter can specify that the session should terminate after a specified length of time or after the arrival of a specified number of packets or requests.

Figure 3:
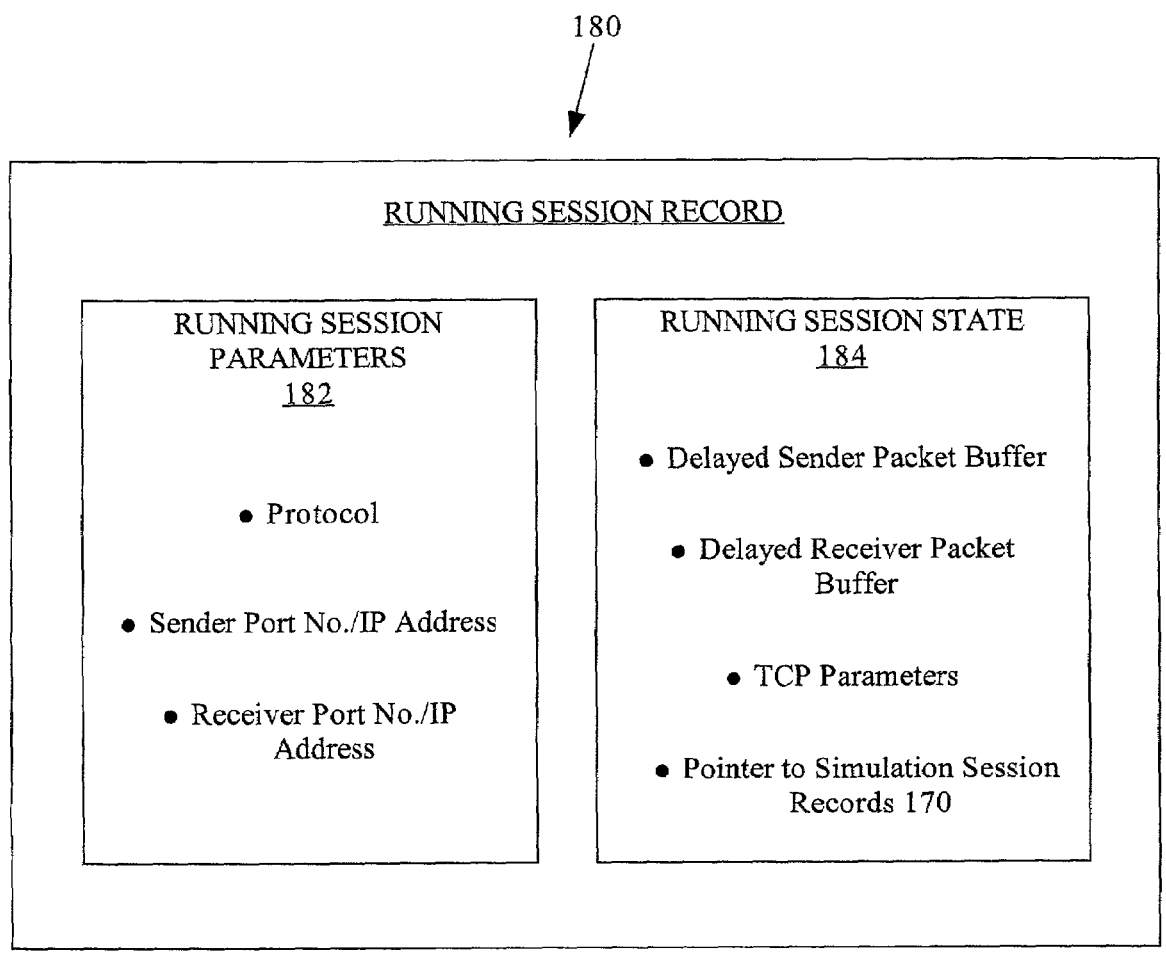
FIG. 3 illustrates a detailed depiction of a running session record of the application server load simulator of FIG. 1B.

FIG. 3 illustrates a detailed depiction of running session record 180 of simulator 120 (FIG. 1B). Once a simulation session is configured using simulation parameters 172 and begins according to simulation activation parameters 174 (FIG. 2), simulator engine 130 keeps a record of the state of each running simulation session in running session record 180. Running session record 180 comprises a running session parameters section 182 and a running session state section 184.

Running session parameters section 182 keeps track of the connection data between sender 105 and receiver 106 for a simulation session that has already begun and is currently in progress. Running session parameters section 182 comprises protocol parameters, IP address and port for sender 105 and IP address and port for receiver 106.

Running session state section 184 retains information as to the state of a simulation session that is currently in progress. Running session state section 184 comprises a delayed sender packet buffer, a delayed receiver packet buffer, a TCP parameters section and a reference (such as a pointer) to simulation session record 170.

The delayed sender packet buffer and delayed receiver packet buffer are used by simulator engine 130 to store and hold the incoming data packets 110 of the request. As described above, in one embodiment, simulator 120 operates in either transmission direction, or bi-directionally. Thus, delayed sender packet buffer is used to store data packets 110 that are sent from sender 105 and delayed receiver packet buffer is used to store data packets 110 that are sent from receiver 106. In addition to storing data packets 110 in the delayed packet buffers, simulator engine 130 also keeps a record of the arrival time of each data packet 110.

The TCP parameters section contains information critical to maintaining an open TCP connection between sender 105 and receiver 106. These parameters include, but are not limited to, the greatest acknowledgement number of all data packets 110 received from sender 105, and the greatest acknowledgement number of all data packets sent in the opposite direction. The pointer to simulation session record 170 allows running session record 180 to reference the parameters of the simulation session that is running. All parameters contained in simulation session record 170 are thus available to running session record 180.

3.0 Operational Overview

Figure 4:
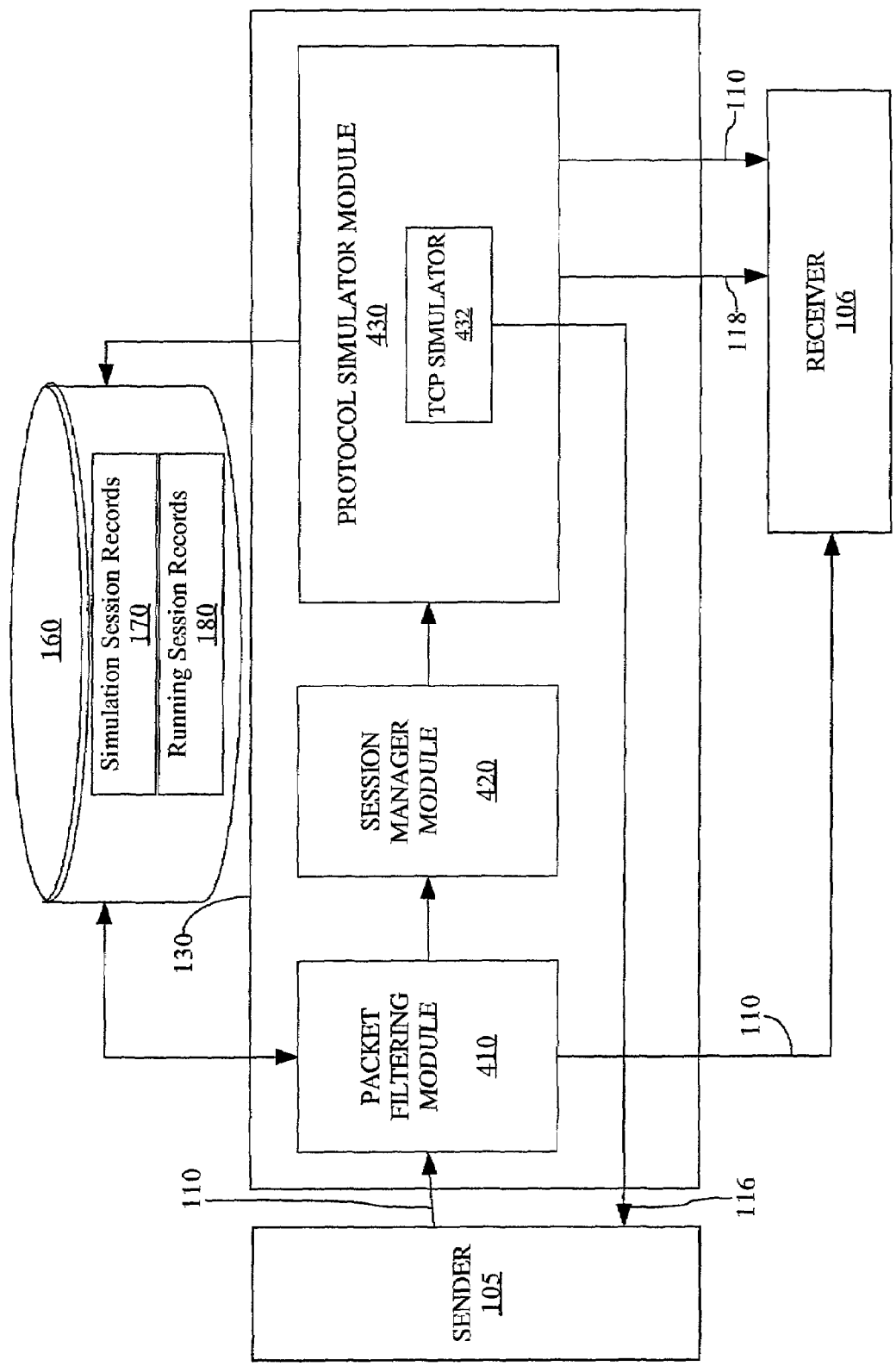
FIG. 4 is a block diagram illustrating the operation of a simulator engine.

FIG. 4 is a block diagram illustrating the operation of simulator engine 130. Simulator engine 130 comprises a packet-filtering module 410, a session manager module 420 and a protocol simulator module 430, which can process both TCP and UDP packets. For purposes of illustrating a clear example, in the embodiment of FIG. 4, protocol simulator module 430 comprises a TCP simulator 432; alternatively or additionally, a UDP simulator is provided. Simulator engine 130 interacts with simulation session record 170 and running session record 180, which are stored in storage 160.

As discussed above in reference to FIG. 1B, simulator engine 130 of simulator 120 intercepts the data packets 110 of the request transmitted by sender 105 to receiver 106. As shown in FIG. 4, simulator engine 130 will accept data packets 110 and pass them through packet filtering module 410. The function of packet filtering module 410 is to analyze data packets 110 from the request and determine whether the packets have been identified as belonging to a simulation session configured in simulation session records 170.

Upon receiving data packet 110, packet filtering module 410 tests whether the packet belongs to a running session record 180 and should therefore be subject to an existing simulation session already in progress. If so, then data packet 110 is passed on to session manager module 420 along with running session record 180 and is processed according to the simulation session parameters as described below.

If data packet 110 is not part of an existing running session record 180, packet filtering module 410 determines whether data packet 110 belongs to a simulation session configured in simulation session record 170. If such a configured simulation session exists, then packet filtering module 410 creates a new running session record 180 and passes it and data packet 110 to session manager module 420 to be processed accordingly.

If data packet 110 belongs to neither a running simulation session in running session record 180 nor a configured simulation session in simulation session record 170, then packet filtering module 410 forwards data packet 110 of the request directly to receiver 106, without processing by simulator 120.

As described above, session manager module 420 receives both data packet 110 and running session record 180 associated with data packet 110. The function of session manager module 420 is to determine whether the incoming data packet 110 should be delayed or forwarded on to receiver 106 by simulator engine 130.

Session manager module 420 first checks whether the running simulation session should remain active. This determination is based on information taken from the session length parameter of simulation activation parameters 174 (FIG. 2). If it is determined that the simulation session has expired, and if the delayed packet buffers of running session state 184 are empty, session manager module 420 will cause protocol simulator module 430 to forward data packets 110 to receiver 106 without further processing. If the simulation session has expired and the delayed packet buffers of running session state 184 are not empty, then session manager module 420 will cause protocol simulator module 430 to add incoming data packet 110 to the delayed packet buffer and then will forward the all data packets in the delayed packet buffer to receiver 106 in due course according to the FIFO (first in, first out) policy of the buffer.

If the simulation session has not expired, then session manager module 420 checks the session start parameter of simulation activation parameters 174 (FIG. 2) to determine whether the simulation session is due to start. As described above with reference to FIG. 2, the simulation session begins as specified by the session start parameter, which can be defined by various criteria. For example, the session start parameter can specify a time delay (e.g. begin after t milliseconds), a packet arrival delay (e.g. begin after n packets have arrived) or no delay at all. If session manager module 420 determines that the simulation session is not to begin with incoming data packet 110, then session manager module 420 causes protocol simulator module 430 to forward data packet 110 to receiver 106 without further processing. If session manager module 420 determines that the simulation session is to commence with incoming data packet 110, then session manager module 420 causes protocol simulator module 430 to delay data packet 110 according to the parameters of the simulation session, described below.

In one embodiment, incoming data packet 110 is a TCP packet. In this case, session manager module 420 may first check to verify whether the TCP handshake between sender 105 and receiver 106 has been completed. Thus, session manager module 420 may optionally cause protocol simulator module 430 to forward any TCP data packet 110 by protocol simulator module 430 unless and until the TCP handshake has been completed between sender 105 and receiver 106.

Session manager module 420 eventually causes protocol simulator module 430 to release delayed data packets 110 held in the delayed packet buffers for forwarding to receiver 106 after the expiration of the simulated delay time. Thus, a special function of the session manager module 420 is to periodically check the state of each running session in order to determine which delayed packets should be forwarded, and whether the session is expired. In FIG. 4, delayed request 118 represents delayed data packets that have been held in the delayed packet buffers and then forwarded to the receiver after expiration of the simulated delay time. Session manager module 420 accomplishes such release and forwarding at the correct time by periodically checking the first data packet 110 in the delayed buffer of a particular running session record 180. If the delay period specified by the simulated delay time parameter of simulation session record 170 has expired, session manager module 420 releases delayed data packet 118 and cause it to be forwarded by protocol simulator module 430 to receiver 106. If the delay period for data packet 110 has not expired, session manager module 420 checks the delayed buffer of the next running session record 180, if any. This process continues until all delayed buffers of all running session records 180 have been checked and released as required.

After determining whether data packets 110 should be delayed or forwarded, session manager module 420 makes one or more appropriate function calls to protocol simulator module 430 to implement the delay or forwarding of data packets 110 accordingly. Data packets 110 slated for delay are stored, along with a record of the arrival time of data packet 110, in the delay buffer of running session state section 184 of running session record 180 (FIG. 3) by protocol simulator module 430. Data packets 110 for forwarding are passed on to receiver 106 by protocol simulator module 430. Forwarded data packets 110 include those that were delayed (after expiration of a simulation delay time) or undelayed (if not subject to a simulation session).

For purposes of illustrating a clear example, the operation of protocol simulator module 430 is described herein with respect to processing a stream of TCP packets. However, protocol simulator module 430 can operate with UDP packets or packets of any other suitable protocol.

In the case of TCP, packets arriving at protocol simulator module 430 are processed by TCP simulator 432. If session manager module 420 determines that the TCP packet should be delayed, session manager module 420 makes a delay function call to TCP simulator 432 that places the TCP packet in the delayed buffer of running session record 180, indicating the time of arrival of the packet. In order to keep the TCP connection between sender 105 and receiver 106 open, TCP simulator 432 sends simulator acknowledgement message 116 to sender 105. Specifically, TCP simulator 432 copies the value in the sequence number field of the incoming TCP packet to the acknowledgement number and window field of simulator acknowledgement message 116. TCP simulator 432 also copies the greatest value of all acknowledgement numbers received from the TCP packets in the TCP parameters section of running session state 184 of running session record 180 (FIG. 3). TCP simulator 432 then replaces the value in the acknowledgement number field of data packet 110 with the greatest value of the acknowledgment number stored in the TCP parameters section before forwarding data packet 110 from the delayed buffers to receiver 106.

Occasionally, sender 105 may retransmit a TCP packet to receiver 106 before simulator acknowledgement message 116 is received at sender 105. For this reason, TCP simulator 432 checks the delayed packet buffers of running session record 180 for packets containing a sequence number identical to that of the incoming packet. If an identical sequence number is found, TCP simulator 432 replaces the stored packet with the newly arrived packet.

Referring again to FIG. 1B, delayed acknowledgement message 112 also is intercepted by simulator engine 130. If a simulation session is active, simulator engine 130 will return a simulator acknowledgement message 116 to sender 105 upon receipt of each data packet 110 of the request. After the requests 110 are forwarded to the receiver, the receiver sends back an acknowledgement message 112. If this message is "piggy back" on a data packet, the data packet is processed by the simulator engine as described above. If the acknowledgement message is sent by a dedicated packet, then the greatest value of the acknowledgement numbers is saved in the TCP session parameter for the current session, and the message is discarded.

Figure 5:
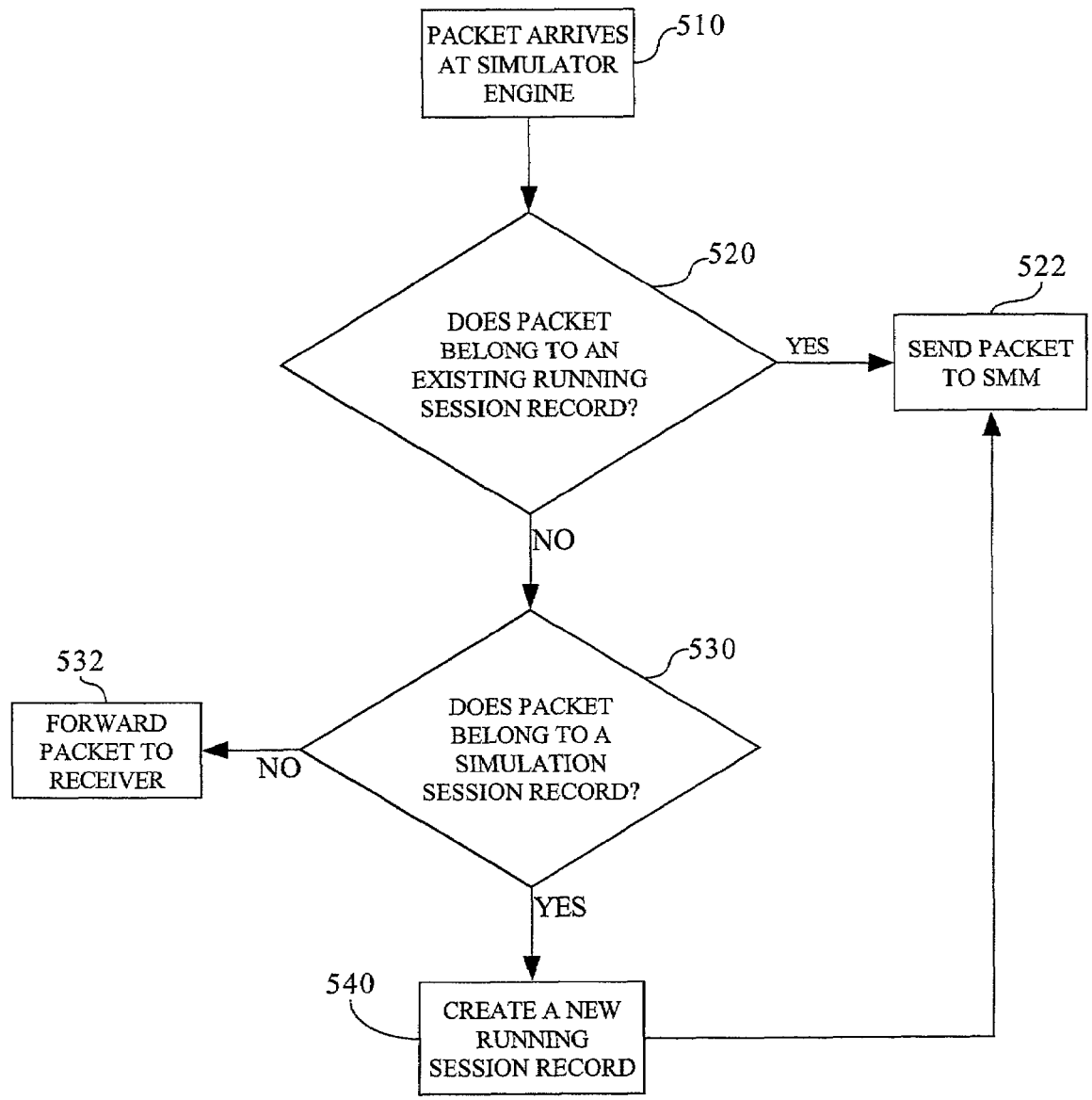
FIG. 5 is a flow diagram outlining the operation of a packet filtering module of the simulator engine of FIG. 4.

FIG. 5 is a flow diagram outlining the operation of packet filtering module 410 of simulator engine 130 of FIG. 4. At step 510, data packet 110 of the request from sender 105 arrives at simulator engine 130 to be processed by packet filtering module 410. At step 520, packet filtering module 410 determines whether incoming data packet 110 belongs to a particular running session record 180. If so, then at step 522 data packet 110 is passed on to session manager module 420 along with the appropriate running session record 180, where it is processed according to the flow diagram described below in reference to FIG. 6.

If packet filtering module 410 determines that incoming data packet 110 does not belong to an existing running session record 180, then in step 530 packet filtering module 410 next determines whether incoming data packet 110 belongs to a particular simulation session record 170. If so, then in step 540 packet filtering module 410 creates a new running session record 180 and passes both data packet 110 and running session record 180 to session manager module 420 in step 522 for processing according to the flow diagram described below with reference to FIG. 6.

If packet filtering module 410 does not determine that incoming data packet 110 belongs to a particular simulation session record 170, then data packet 110 is not subject to a simulation session and packet filtering module 410 will forward data packet 110 directly to receiver 106 in step 532.

Figure 6:
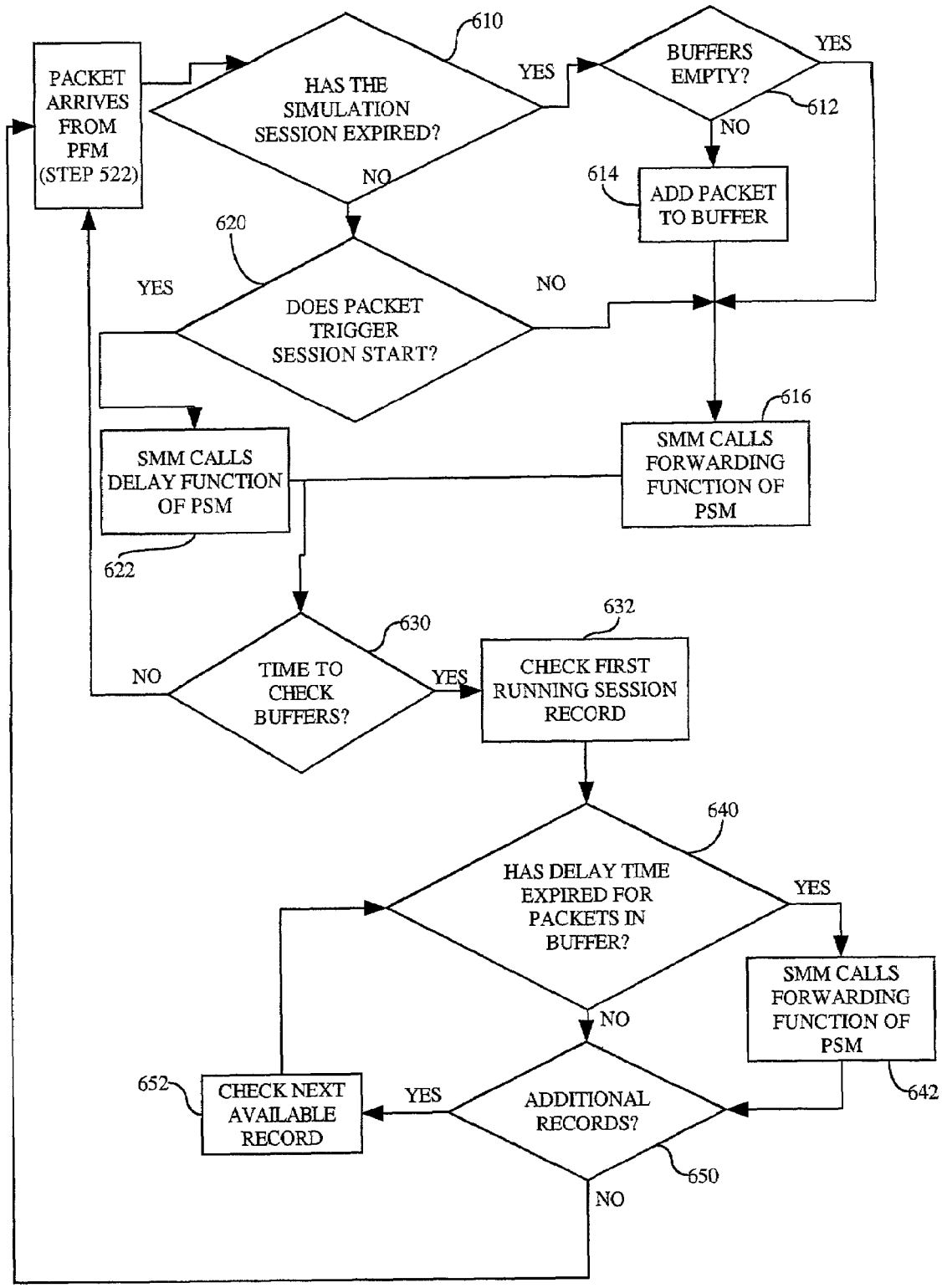
FIG. 6 is a flow diagram outlining the operation of a session manager module of the simulator engine of FIG. 4.

FIG. 6 is a flow diagram outlining the operation of session manager module 420 of simulator engine 130 after data packet 110 is passed from packet filtering module 410 in step 522 of FIG. 5. At step 610 of FIG. 6, session manager module 420 determines whether the simulation session defined in running session record 180 has expired. If the simulation session has expired, both incoming data packet 110 and all data packets 110 stored in the delayed packet buffers of running session record 180 must be forwarded on to receiver 106.

Thus, at step 612, session manager module 420 checks to see if the delayed packet buffers of running session record 180 are empty. If so, then at step 616, session manager module 420 causes protocol simulator module 430 to forward incoming data packets 110 to receiver 106 according to the flow diagram described below with reference to FIG. 7B. If the buffers are not empty, then at step 614 session manager module 420 causes protocol simulator module 430 to add incoming data packet 110 to the delayed packet buffer, and at step 616 all data packets 110 stored in the delayed packet buffer are forwarded by protocol simulator module 430 to receiver 106 in due course according to the FIFO (first in, first out) policy of the buffer and as shown in the flow diagram described below with reference to FIG. 7B.

If it is determined in step 610 that the simulation session has not expired, then at step 620 session manager module 420 determines whether incoming data packet 110 should trigger the start of the simulation session. As described above, a simulation session is started based on the session start parameter configured in simulation session record 170

(FIG. 2). If incoming data packet 110 does not trigger the start of a simulation session, then the process returns to step 616 where data packet 110 is forwarded according to the flow diagram described below with reference to FIG. 7B. If incoming data packet 110 triggers the start of a simulation session, or if a previously received data packet 110 has already triggered the simulation session, then at step 622 session manager module 420 causes protocol simulator module 430 to delay data packet 110 according to the flow diagram described below with reference to FIG. 7A.

Session manager module 420 will periodically check the status of data packets 110 stored in the delayed packet buffers of running session record 180 to determine if the packets have been held for the prescribed period of time. Thus, at step 630, session manager module 420 determines if such a periodic check should be performed. If not, then the process returns to step 522 and session manager module 420 waits for the arrival of a new incoming data packet 110 from packet filtering module 410.

If session manager module 420 determines that a check of the delayed packet buffer is required, then in step 632 session manager module 420 checks the delayed packet buffer of the first available running session record 180. In step 640, session manager module 420 determines, for each data packet 110 stored in the delayed packet buffer of running session record 180, whether the delay time, specified by the simulated delay time parameter of simulation session record 170 (FIG. 2), has expired. If not, then in step 650, session manager module 420 determines whether any more running session records 180 exist. If no other running session records 180 exist, then the process returns to step 522 where session manager module 420 waits for the arrival of a new incoming data packet 110 from packet filtering module 410. If additional running session records 180 exist, then in step 652 session manager module 420 checks the status of the next available running session record 180 and step 640 is repeated for that running session record 180.

If session manager module 420 determines that the simulated delay time parameter has expired for any data packets 110 stored in the delayed packet buffer of running session record 180, then in step 642 session manager module 420 causes protocol simulator module 430 to forward all expired data packets 110 to receiver 106 according to the flow diagram described below with reference to FIG. 7B. The process then returns to step 650 for a determination of whether any more running session records 180 exist.

Figure 7A:
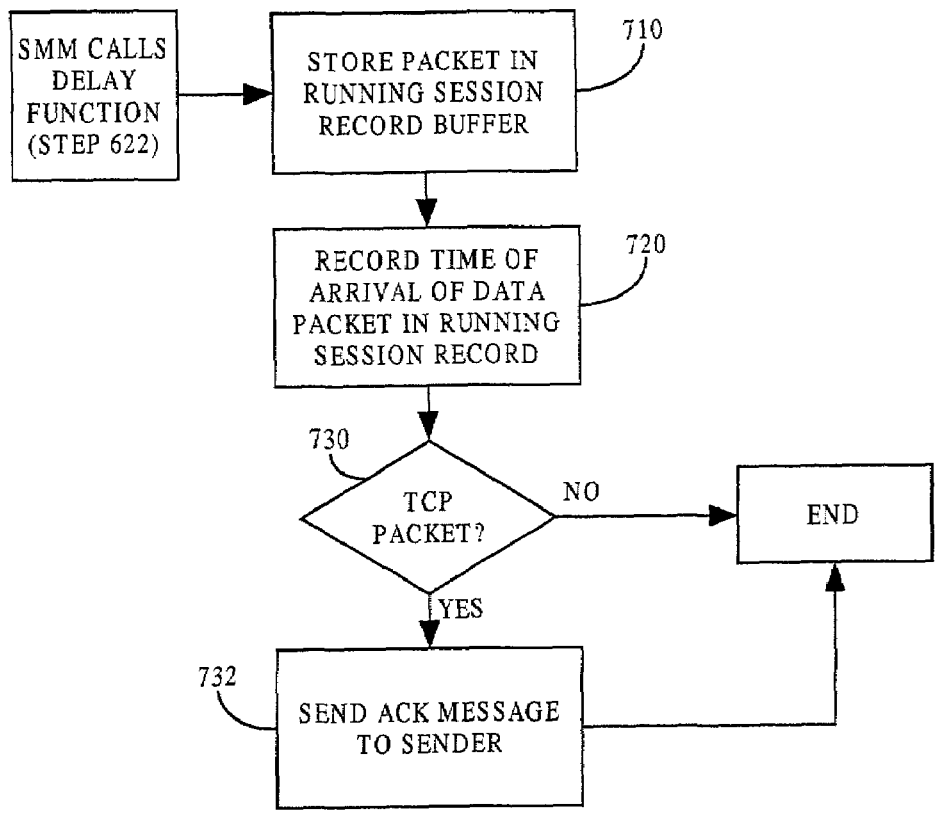
FIG. 7A is a flow diagram outlining the operation of a delay function of a protocol simulator module of the simulator engine of FIG. 4.

FIG. 7A is a flow diagram outlining the operation of the delay function of protocol simulator module 430 that delays transmission of data packets 110. As described above in reference to FIG. 6, at step 622, session manager module 420 determines that data packet 110 should be delayed, and calls the delay function of protocol simulator module 430. In step 710, protocol simulator module 430 stores data packet 110 in the buffer of running session record 180. At step 720, 430 also stores the time of arrival of data packet 110 in the running session record 180. The arrival time is used by session manager module 420 to determine whether a delayed data packet 110 has been held in the buffer for the appropriate period of time.

In step 730, protocol simulator module 430 determines whether data packet 110 is a TCP packet. If so, then at step 732 protocol simulator module 430 sends simulator acknowledgement message 116 to sender 105 as described above with reference to FIG. 4.

Figure 7B:
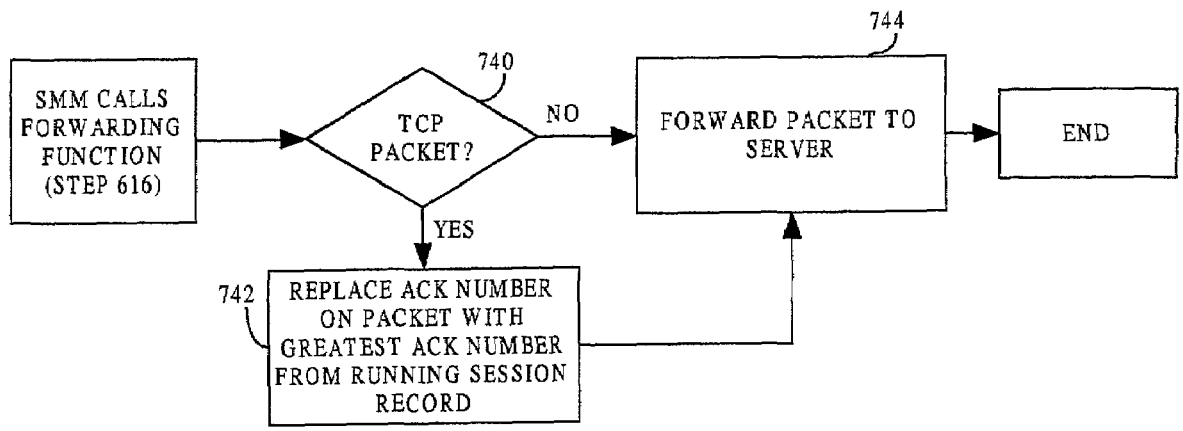
FIG. 7B is a flow diagram outlining the operation of a forwarding function of the protocol simulator module of the simulator engine of FIG. 4.

FIG. 7B is a flow diagram outlining the operation of the forwarding function of protocol simulator module 430 that forwards transmission of data packets 110 to receiver 106. As described above in reference to FIG. 6, at step 616, session manager module 420 determines that data packet 110 should be forwarded to receiver 106, and calls the forwarding function of protocol simulator module 430. In step 740, protocol simulator module 430 determines whether data packet 110 is a TCP packet. If so, then in step 742 protocol simulator module 430 will then replace the value in the acknowledgement number field of data packet 110 with the greatest value of the acknowledgment number stored in the TCP parameters section of running session records 180, as described above in reference to FIG. 4. Then in step 744, data packet 110 is forwarded to receiver 106.

4.0 Implementation Mechanisms—Hardware Overview

Figure 8:
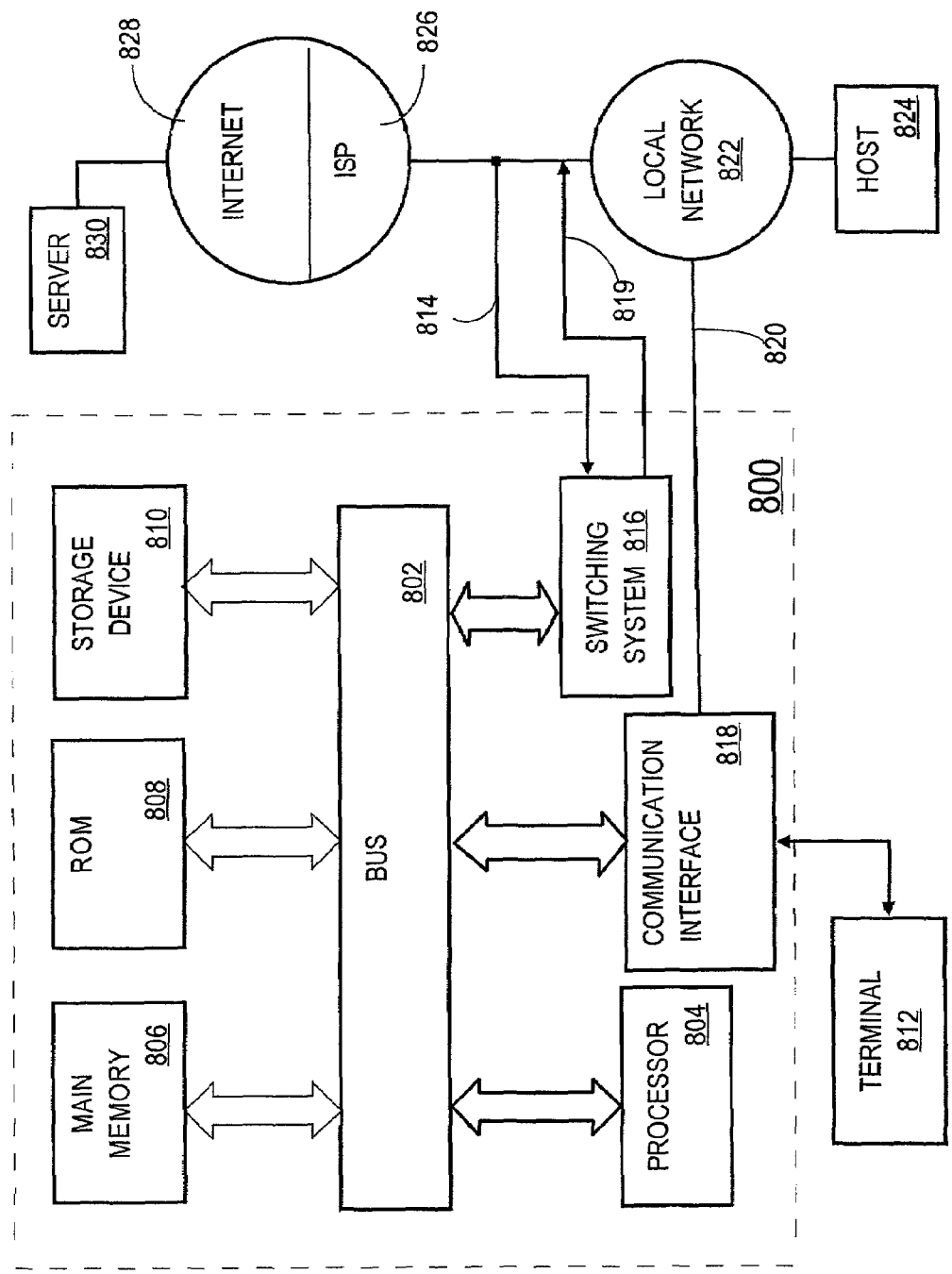
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for simulating a load on an application server in a network. According to one embodiment of the invention, simulating a load on an application server in a network is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, and non-volatile media, volatile media, and transmission media. Computer-readable storage media includes both non-volatile media and volatile media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802.

Common forms of computer-readable storage media include, for example, a floppy disk, a flexible disk, hard disk, magnetic tape, or any other magnetic storage medium, a CD-ROM, any other optical storage medium, punchcards, papertape, any other physical storage medium with patterns of holes, a RAM, a PROM, an EPROM, a FLASH-EPROM, any other memory chip or cartridge, or any other storage medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for simulating a load on an application server in a network as described herein.

The received code may be executed by processor 804 as it is received, and/or stored in storage device 810, or other non-volatile storage for later execution. In this manner, computer system 800 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for simulating delay in a receiving network node responding to a request, comprising the steps of:
responsive to a determination that a simulation is to be performed of the receiving network node receiving a request from a sending network node and sending, after a delay, a response to the sending network node, wherein the response services the request, intercepting one or more data packets of at least one of:
the request from the sending network node to the receiving network node, wherein the data packets are not permitted to reach the receiving network node until after a specified delay time; or
a response to the request, said response from the receiving network node to the sending network node, wherein the data packets are not permitted to reach the sending network node until after the specified delay time;
in response to intercepting a data packet form the sending network node, sending an acknowledgment message to the sending network node, wherein the acknowledgment message simulates that the receiving network node has received the intercepted data packet;
retaining the data packets;
releasing the data packets after the specified delay time, wherein delaying the data packets simulates the receiving network node receiving the request from the sending network node and sending the response to the request after the specified delay time; and
forwarding the data packets after the specified delay time to one of the receiving network node and the sending network node.

2. The method of claim 1 fiber comprising the step of intercepting an acknowledgement message that the receiving network node sends in response to receiving a data packets from the sending network node that was intercepted.

3. An apparatus for simulating delay in a receiving network node responding to a request, comprising:
means for intercepting one or more data packets of at least one of:
a request from a sending network node to the receiving network node, wherein the data packets are not permitted to reach the receiving network node until after a specified delay time; and
a response to the request, said response from the receiving network node to the sending network node, wherein the data packets are not permitted to reach the sending network node until after the specified delay time;
wherein said means for intercepting are responsive to a determination that a simulation is to be performed of the receiving network node receiving the request from the sending network node and sending, after a delay, the response to the sending network node, wherein the response services the request;
means for retaining the data packets;
means for sending an acknowledgment message to the sending network node in response to intercepting a data packet from the sending network node, wherein the acknowledgment message simulates that the receiving network node has received the intercepted data packet;
means for releasing the data packets after the specified delay time, wherein delaying the data packets simulates the receiving network node receiving the request from the sending network node and sending the response to the request after the specified delay time; and
means for forwarding the data packets to one of the receiving network node and the sending network node after the specified delay time.

4. The apparatus of claim 3 further comprising means for recording a time of arrival of the data packets.

5. The apparatus of claim 3 further comprising means for selecting particular ones of the data packets based on port and address information of the sending network node.

6. The apparatus of claim 3 further comprising means for selecting particular ones of the data packets based on a specified start parameter.

7. The apparatus of claim 6 wherein the start parameter is a specified period of time.

8. The apparatus of claim 6 wherein the start parameter is a specified number of data packets intercepted.

9. The apparatus of claim 6 wherein the end parameter is a specified period of time.

10. The apparatus of claim 6 wherein the end parameter is a specified number of data packets intercepted.

11. The apparatus of claim 3 further comprising means for sending a TCP acknowledgement message to the sending network node of the request after a data packet from the sending network node is intercepted.

12. The apparatus of claim 11 further comprising means for intercepting a TCP acknowledgement message from the receiving network node of we request after the data packet from the sending network node is forwarded to the receiving network node.

13. The apparatus of claim 3 wherein the means for intercepting one or more data packets comprise means for selecting particular ones of the data packets for interception based on one or more criteria.

14. The apparatus of claim 13 wherein the means for selecting particular ones of the data packets comprise means for selecting particular ones of the data packets based on a predetermined end parameter.

15. The apparatus of claim 3 wherein the means for selecting particular ones of the data packets comprise means for selecting particular ones of the data packets based on a communications protocol of the data packets.

16. The apparatus of claim 3, wherein the delay time is a first specified delay time, and wherein the means for intercepting one or more data packets comprise means for intercepting one or more data packets of the request from the sending network node to the receiving network node, and further comprising:

means for intercepting one or more data packets of the response from the receiving network node to the sending network node, wherein the data packets of the response are not permitted to reach the sending network node until after a second specified delay time;
means for retaining the data packets of the response;
means for releasing the data packets of the response after the second specified delay time, wherein delaying the data packets for the second specified delay time simulates the receiving network node receiving the request from the sending network node and sending the response to the request after the second specified delay time; and
means for forwarding the data packets of the response to the sending network node after the second specified delay time.

17. The apparatus of claim 3 wherein the specified delay time is specified by data input that is received before the intercepting step.

18. The apparatus of claim 3 wherein the means for retaining the data packets comprise means for storing the data packets in a buffer.

19. The apparatus of claim 3 further comprising means for intercepting an acknowledgement message from the receiving network node of the request after a data packet intercepted from the sending network node is forwarded to the receiving network node.

20. An apparatus for simulating a delay, comprising:
a simulator engine; and
a storage, the storage including,
 one or more simulation session records, wherein a particular session record comprises information identifying a connection and a delay time specifying a length of time for which data packets in transfer in at least one direction on the connection are to be delayed, and
 one or more running session records, the running session records having a buffer for data packet storage that stores data packets that the simulator engine determines are to be delayed in accordance with information stored in the simulation session records; and
wherein the simulator engine includes:
a session manager module that determines whether data packets received by the apparatus should be delayed based in information in the session records, and
a packet filtering module that, based on the determination by the session manager that data packets received by the apparatus should be delayed, intercepts one or more data packets in transfer in at least one direction on the connection,
an acknowledgement message intercept module;
wherein the intercepted data packets are stored in the buffer and released after the delay time to prevent the packets from reaching a destination node on the connection for the delay time, wherein preventing the packets from reaching the destination node simulates the load on the application server;
wherein the acknowledgment message intercept module is operable to send an acknowledgement message to a network node that transmitted the intercepted data packets, wherein the acknowledgment message replaces an acknowledgment message that would have been sent by the destination node if the data packets had not been intercepted.

21. An apparatus as recited in claim 20, further comprising a protocol simulator module.

22. An apparatus as recited in claim 20, wherein the destination node is the application server.

23. An apparatus as recited in claim 20, wherein the destination node is a node on the connection to which the application server sends a response.

24. A computer-readable storage medium having stored thereon one or more sequences of instructions which, when executed by one or more processors, cause the one or more processors to carry out a method for simulating delay in a receiving network node responding to a request, the steps comprising:
  responsive to a determination that a simulation is to be performed of the receiving network node receiving a request from a sending network node and sending, after a delay, a response to the sending network node, wherein the response services the request, intercepting one or more data packets of at least one of:
    the request from the sending network node to the receiving network node, wherein the data packets are not permitted to reach the receiving network node until after a specified delay time; and
    a response to the request, said response from the receiving network node to the sending network node, wherein the data packets are not permitted to reach the sending network node until after the specified delay time;
  retaining the data packets;
  releasing the data packets after the specified delay time, wherein delaying the data packets simulates the receiving network node receiving the request from the sending network node and sending the response to the request after the specified delay time; and
  forwarding the data packets after the specified delay time to one of the receiving network node and the sending network node.

25. An apparatus, comprising:
  a network interface that is coupled to the data network for receiving one or more packet flows therefrom;
  a processor;
  one or more stored sequences of instructions which, when executed by the processor, cause the processor to perform:
    responsive to a determination that a simulation is to be performed of a receiving network node receiving a request from a sending network node and sending, after a delay, a response to the sending network node, wherein the response services the request, intercepting one or more data packets of at least one of:
      the request from the sending network node to the receiving network node, wherein the data packets are not permitted to reach the receiving network node until after a specified delay time; or
      a response to the request, said response from the receiving network node to the sending network node, wherein the data packets are not permitted to reach the sending network node until after the specified delay time;
    in response to intercepting a data packet from the sending network node, sending an acknowledgment message to the sending network node, wherein the acknowledgment message simulates that the receiving network node has received the intercepted data packet;
    retaining the data packets;
    releasing the data packets after the specified delay time, wherein delaying the data packets simulates the receiving network node receiving the request from the sending network node and sending the response to the request after the specified delay time; and
    forwarding the data packets after the specified delay time to one of the receiving network node and the sending network node.

26. The apparatus of claim 25, wherein the delay time is a first specified delay time, and wherein the sequences of instructions that cause the processor to perform intercepting one or more data packets comprise sequences of instructions which, when executed by the processor, cause the processor to perform intercepting one or more data packets of the request from the sending network node to the receiving network node, and
  further comprising sequences of instructions which, when executed by the processor, cause the processor to perform:
    intercepting one or more data packets of the response from the receiving network node to the sending network node, wherein the data packets of the response are not permitted to reach the sending network node until after a second specified delay time;
    in response to intercepting a data packet from the sending network node sending an acknowledgment message to the sending network node, wherein the acknowledgment message simulates that the receiving network node has received the intercepted data packet;
    retaining the data packets of the response;
    releasing the data packets of the response after the second specified delay time, wherein delaying the data packets for the second specified delay time simulates the receiving network node receiving the request from the sending network node and sending the response to the request after the second specified delay time; and
    forwarding the data packets of the response to the sending network node after the second specified delay time.

27. The apparatus of claim 25 wherein the specified delay time is specified by data input that is received before the intercepting step.

28. The apparatus of claim 25 wherein the sequences of instructions that cause the processor to perform retaining the data packets comprise sequences of instructions which, when executed by the processor, cause the processor to perform storing the data packets in a buffer.

29. The apparatus of claim 25 wherein the sequences of instructions that cause the processor to perform retaining the data packets comprise sequences of instructions which, when executed by the processor, cause the processor to perform recording a time of arrival of the data packets.

30. The apparatus of claim 25 wherein the sequences of instructions that cause the processor to perform intercepting one or more data packets comprise sequences of instructions which, when executed by the processor, cause the processor to perform selecting particular ones of the data packets for interception based on one or more criteria.

31. The apparatus of claim 30 wherein the sequences of instructions that cause the processor to perform selecting particular ones of the data packets comprise sequences of instructions which, when executed by the processor, cause the processor to perform selecting particular ones of the data packets based on a communications protocol of the data packets.

32. The apparatus of claim 30 wherein the sequences of instructions that cause the processor to perform selecting particular ones of the data packets comprise sequences of instructions which, when executed by the processor, cause the processor to perform selecting particular ones of the data packets based on port and address information of the sending network node.

33. The apparatus of claim 30 wherein the sequences of instructions that cause the processor to perform selecting particular ones of the data packets comprise sequences of instructions which, when executed by the processor, cause the processor to perform selecting particular ones of the data packets based on a specified start parameter.

34. The apparatus of claim 33 wherein the start parameter is a specified period of time.

35. The apparatus of claim 33 wherein the start parameter is a specified number of data packets intercepted.

36. The apparatus of claim 30 wherein the sequences of instructions that cause the processor to perform selecting particular ones of the data packets comprise sequences of instructions which, when executed by the processor, cause the processor to perform selecting particular ones of the data packets based on a predetermined end parameter.

37. The apparatus of claim 36 wherein the end parameter is a specified period of time.

38. The apparatus of claim 36 wherein the end parameter is a specified number of data packets intercepted.

39. The apparatus of claim 25 wherein the data packets comprise Transmission Control Protocol (TCP) packets.

40. The apparatus of claim 39 wherein the sequences of instructions which, when executed by the processor, cause the processor to perform sending an acknowledgment message to the sending network node comprise sequences of instructions which, when executed by the processor, cause the processor to perform sending a TCP acknowledgement message to the sending network node of the request after a data packet from the sending network node is intercepted.

41. The apparatus of claim 39 further comprising sequences of instructions which, when executed by the processor, cause the processor to perform intercepting a TCP acknowledgement message from the receiving network node of the request after a data packet that was intercepted from the sending network node is forwarded to the receiving network node.

42. The apparatus of claim 39 wherein the sequence of instructions which, when executed by the processor, cause the processor to perform sending an acknowledgment message to the sending node comprise sequences of instructions which, when executed by the processor, cause the processor to perform sending a TCP acknowledgement message to the sending network node of the request after a data packet from the sending network node is intercepted.

43. The apparatus of claim 42 further comprising sequences of instructions which, when executed by the processor, cause the processor to perform intercepting an acknowledgement message from the receiving network node of the request after a data packet that was intercepted from the sending network node is forwarded to the receiving network node.

\* \* \* \* \*